(12) United States Patent
Yasukochi et al.

(10) Patent No.: US 11,262,731 B2
(45) Date of Patent: Mar. 1, 2022

(54) TOOL PATH GENERATION METHOD AND DEVICE

(71) Applicant: MAKINO MILLING MACHINE CO., LTD., Tokyo (JP)

(72) Inventors: Jiro Yasukochi, Aiko-gun (JP); Kyohei Suzuki, Aiko-gun (JP); Soichiro Asami, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 12 days.

(21) Appl. No.: 16/498,720

(22) PCT Filed: Mar. 31, 2017

(86) PCT No.: PCT/JP2017/013772
§ 371 (c)(1),
(2) Date: Sep. 27, 2019

(87) PCT Pub. No.: WO2018/179401
PCT Pub. Date: Oct. 4, 2018

(65) Prior Publication Data
US 2021/0109502 A1 Apr. 15, 2021

(51) Int. Cl.
*G05B 19/414* (2006.01)
*G05B 19/23* (2006.01)
*G05B 19/41* (2006.01)

(52) U.S. Cl.
CPC ......... *G05B 19/4141* (2013.01); *G05B 19/23* (2013.01); *G05B 19/41* (2013.01)

(58) Field of Classification Search
None
See application file for complete search history.

(56) References Cited

U.S. PATENT DOCUMENTS 5,033,005 A * 7/1991 Haske ................ G05B 19/4099
700/187
5,339,015 A * 8/1994 Hanaki .............. G05B 19/4061
318/565

(Continued)

FOREIGN PATENT DOCUMENTS

JP 9-47939 A 2/1997
JP 2005352876 A * 12/2005

(Continued)

*Primary Examiner* — Mohammad Ali
*Assistant Examiner* — David Earl Ogg
(74) *Attorney, Agent, or Firm* — Morrison & Foerster LLP (57) ABSTRACT

The present invention sets a single machining point on a plurality of tool path rows, selects a machining point in a prescribed range with the point to be machined as the center, calculates the tool orientation at the point to be machined by way of averaging the tool orientation of the selected machining point of interest, corrects data pertaining to the tool orientation of the point to be machined by way of the calculated average tool orientation, acquires the shape data of a workpiece to be machined and the shape data of a ball end mill to be used, performs an interference check for the workpiece and the ball end mill on the basis of the corrected tool orientation data, and generates a new tool path on the basis of data pertaining to the corrected tool orientation when no interference between the workpiece and the ball end mill occurs.

7 Claims, 11 Drawing Sheets

(56) References Cited

U.S. PATENT DOCUMENTS

| | | | | |
|---|---|---|---|---|
| 5,923,561 | A * | 7/1999 | Higasayama | G05B 19/4097 700/186 |
| 6,535,788 | B1 * | 3/2003 | Yoshida | G05B 19/40931 700/191 |
| 2001/0000805 | A1 * | 5/2001 | Kadono | G05B 19/4097 700/182 |
| 2010/0217416 | A1 * | 8/2010 | Murabata | G05B 19/4093 700/98 |
| 2012/0215334 | A1 * | 8/2012 | Tanuma | G05B 19/4103 700/97 |
| 2015/0012127 | A1 | 1/2015 | Murakami | |
| 2016/0299491 | A1 * | 10/2016 | Kobayashi | G05B 19/4061 |
| 2018/0059636 | A1 * | 3/2018 | Fukumoto | G05B 19/19 |

FOREIGN PATENT DOCUMENTS

| | | | |
|---|---|---|---|
| JP | 2007054940 A | * | 3/2007 |
| JP | 2015-15006 | | 1/2015 |

* cited by examiner

TOOL PATH GENERATION METHOD AND DEVICE

CROSS-REFERENCE TO RELATED APPLICATIONS

This application is a U.S. national phase patent application of International Patent Application No. PCT/JP2017/013772, filed Mar. 31, 2017, which is hereby incorporated by reference in the present disclosure in its entirety.

FIELD OF THE INVENTION

The present invention relates to a method and device for generating a tool path when surface machining of a workpiece is performed with a machine tool comprising at least one rotary feed axis while changing a tool posture of an end mill relative to a workpiece. The end mill of the present invention is a so-called circle segment end mill such as a ball end mill, which machines a workpiece surface by changing the posture of a tool, a barrel-shaped end mill, which is barrel-shaped in a side view, an oval form end mill, which is oval in a side view, or a lens form end mill, the bottom surface of which is convex. Though a representative ball end mill is described below, the present invention can be suitably applied to other circle segment end mills.

BACKGROUND OF THE INVENTION

When a tool is moved along a tool path defined by a machining program for machining a workpiece with a five-axis machine tool comprising two rotary feed axes, if the posture of the tool changes, the quality of the machined surface is reduced due to change in the amount of deflection of the tool, change in the center of rotation of the rotary feed axis due to deviation between the position of the center of rotation of the rotary feed axis in the machine tool settings and the actual position of the center of rotation of the rotary feed axis, change in the curvature of the cutting edge which actually performs on the tip of the tool such as the ball end mill, and change in the acceleration/deceleration of the rotary feed axes. Patent Literature 1 describes a numerical controller with which a reduction in the quality of the machined surface due to such changes in tool posture can be prevented.

Patent Literature

[PTL 1] Japanese Unexamined Patent Publication (Kokai) No. 2015-015006

SUMMARY OF THE INVENTION

Figure 11:
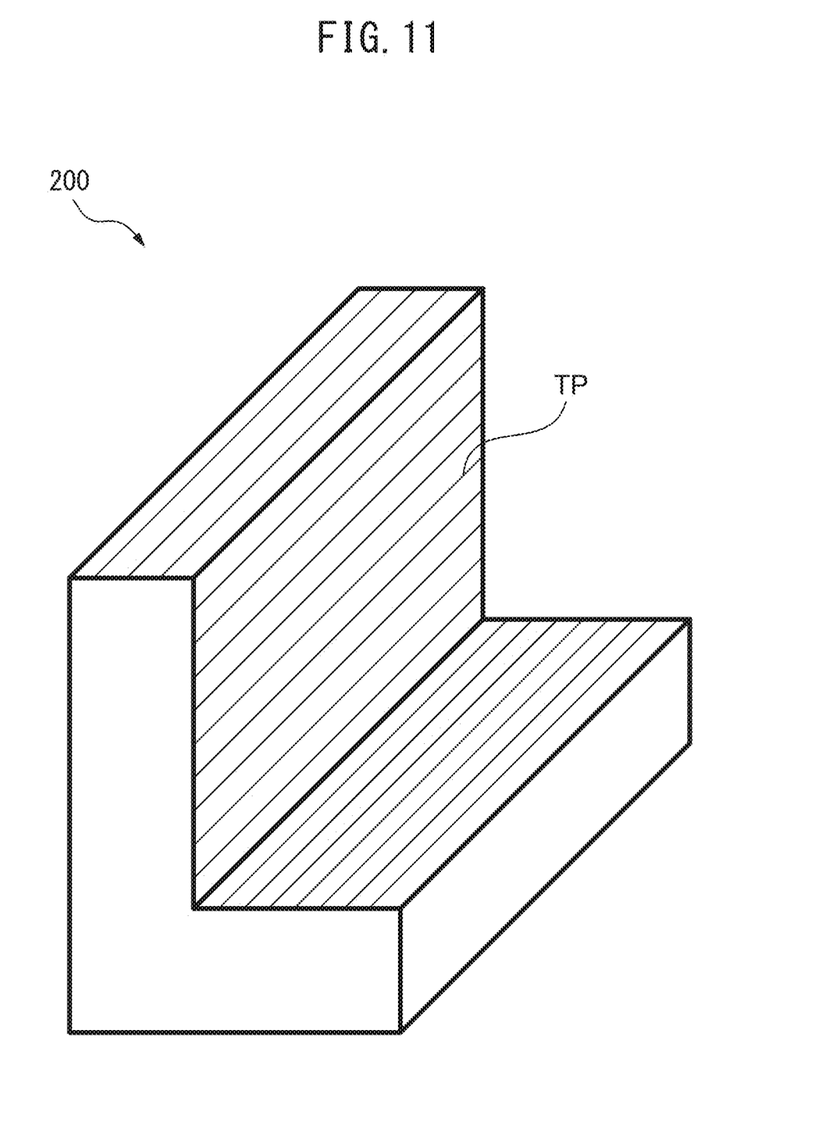
FIG. 11 is a schematic view detailing a tool path when an L-shaped workpiece is subjected to contour machining with a ball end mill.
Figure 12:
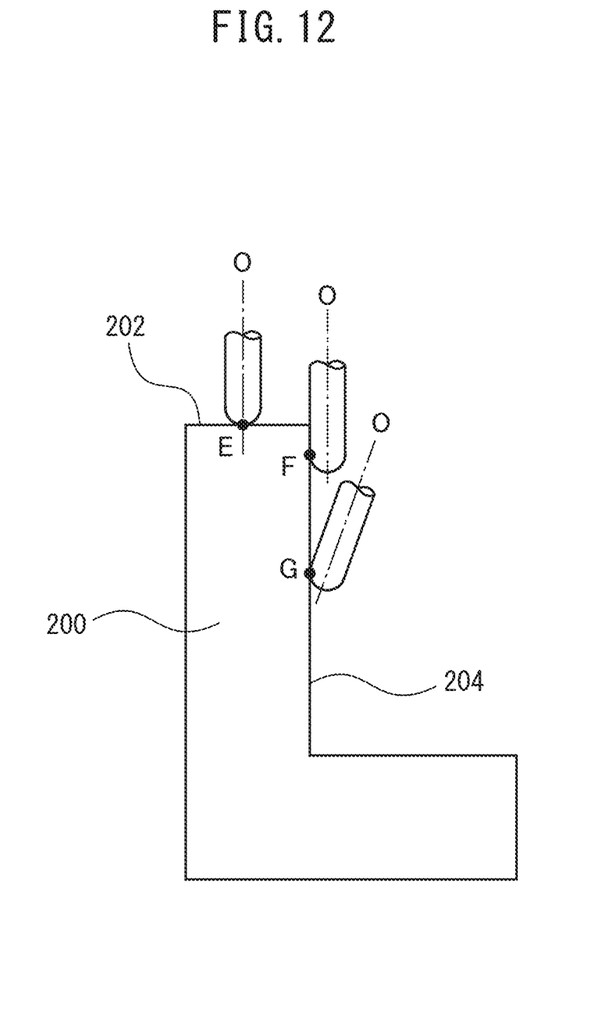
FIG. 12 is a schematic view detailing the relationship between the part of the workpiece to be machined of FIG. 11 and the posture of the tool.

In the actual machining of a workpiece, the posture of the tool changes not only as the tool moves along a single tool path, but as shown in FIGS. 11 and 12, the posture of the tool also changes between adjacent tool paths. FIGS. 11 and 12 show the case in which the side surface of a workpiece W having a substantially L-shaped cross-section is machined along a contoured tool path TP with a five-axis machine tool comprising two rotary feed axes so as to maintain a pick feed amount interval. Specifically, in the case in which the horizontal upper surface 202 of the workpiece W is machined, the case in which the upper portion of the vertical surface 202 is machined, and the case in which the vertical surface of the workpiece W is machined from a central portion to the lower side, the posture of the tool T, that is, the orientation of the vector along the axis of rotation O, changes.

In the numerical controller of Patent Literature 1, a predetermined number of blocks are read in advance as a correction target program command, and the tool direction commands are corrected so that the ratio between the movement amount of the linear shaft and the tool direction vector change amount is constant for each block in the pre-read correction target program command. In the numerical controller of Patent Literature 1, since a plurality of blocks are read in advance, i.e., since the tool direction commands are corrected so that the ratio between the movement amount of the linear shaft and the tool direction vector change amount is constant for each block along a single tool path, when the tool posture changes across a plurality of tool paths, as shown in FIGS. 11 and 12, the numerical controller of Patent Literature 1 cannot effectively correct the posture of the tool.

An example in which the tool and the workpiece come into contact at points E, F, and G will be described with reference to FIG. 12. At points E and F, the tool posture is vertical, and it can be understood that when machining proceeds downward from point G, since the tool holder interferes with an upper part of the workpiece, the tool posture changes. At points E and F or G, the direction in which cutting force is received by the tool changes, whereby the deflection amount of the tool changes. Thus, slight variations in height are formed on the machined surface of the workpiece, whereby the quality of the machined surface is reduced. Since the tool posture command in the machining program is created using the center position of the rotary feed axis in the machine tool settings as a reference, slight variations in height occur on the machined surface due to the impact of deviation of the center of the rotary feed axis, which causes actual production errors. Furthermore, in ball end mills, which are tools, the spherical tip part is taken as a true sphere, and position commands for the machining program are generated based on the center of this sphere. Thus, when the contact point is not a true sphere, slight variations in height occur on the machined surface of the workpiece due to a change the position of contact with the workpiece. Further, when the movement direction of the rotary feed axis is reversed during the movement of the linear feed axis, slight variations in height may occur on the machined surface of the workpiece due to changes in the acceleration/deceleration of the rotary feed axis or synchronization delays. Thus, if the tool posture is gradually changed in the process of machining at points E, F, and G, the influence of these problems is expected to be reduced.

The present invention aims to solve such problems of the prior art, and aims to prevent a reduction in quality of the machined surface due to sudden changes in tool posture when surface machining of a workpiece is performed with an end mill while changing the tool posture with respect to the workpiece.

In order to achieve the above object, according to the present invention, there is provided a method for generating a tool path when surface machining of a workpiece is performed by a machine tool comprising at least one rotary feed axis while changing a tool posture of an end mill relative to a workpiece, the method comprising the steps of setting a single machining point on a plurality of tool paths obtained by sequentially connecting a plurality of machining points in a straight line as a target machining point, and selecting machining points within a predetermined range centered on the target machining point as machining points of interest, calculating a tool posture at the target machining point by averaging the tool postures at the selected machining points of interest, correcting data related to the tool posture at the target machining point in accordance with the calculated average tool posture, acquiring shape data of the workpiece to be machined and shape data of the end mill to be used, checking for interference between the workpiece and the end mill based on the corrected tool posture data, and generating a new tool path based on the data related to the corrected tool posture when interference between the workpiece and the end mill does not occur.

Further, according to the present invention, there is provided a tool path generation device which generates a tool path when surface machining of a workpiece is performed by a machine tool comprising at least one rotary feed axis while changing a tool posture of an end mill relative to a workpiece, the device comprising a machining point selection unit which sets a single machining point on a plurality of tool paths obtained by sequentially connecting a plurality of machining points in a straight line as a target machining point, and selects machining points within a predetermined range centered on the target machining point as machining points of interest, a tool posture averaging unit which calculates a tool posture at the target machining point by averaging the tool postures at the selected machining points of interest, and corrects data related to the tool posture at the target machining point in accordance with the calculated average tool posture, and an interference avoidance processing unit which acquires shape data of the workpiece to be machined and shape data of the end mill to be used, checks for interference between the workpiece and the end mill based on the corrected tool posture data, and generates a new tool path based on the data related to the corrected tool posture when interference between the workpiece and the end mill does not occur.

According to the present invention, since the tool posture at a target machining point is determined by averaging the tool posture on a plurality of tool paths separated by the pick feed amount, the posture of the tool can be effectively corrected even in the case in which the posture of the tool changes along a plurality of tool paths. Furthermore, since it is verified whether there is interference between the workpiece and the tool based on the corrected tool posture, interference between the workpiece and the tool is unlikely to occur due to the correction of the tool posture. As a result, the occurrence of slight variations in height on the workpiece surface due to changes in tool posture is prevented, whereby the quality of the machined surface is improved.

DETAILED DESCRIPTION OF THE INVENTION

The embodiments of the present invention will be described below with reference to the attached drawings.

Figure 1:
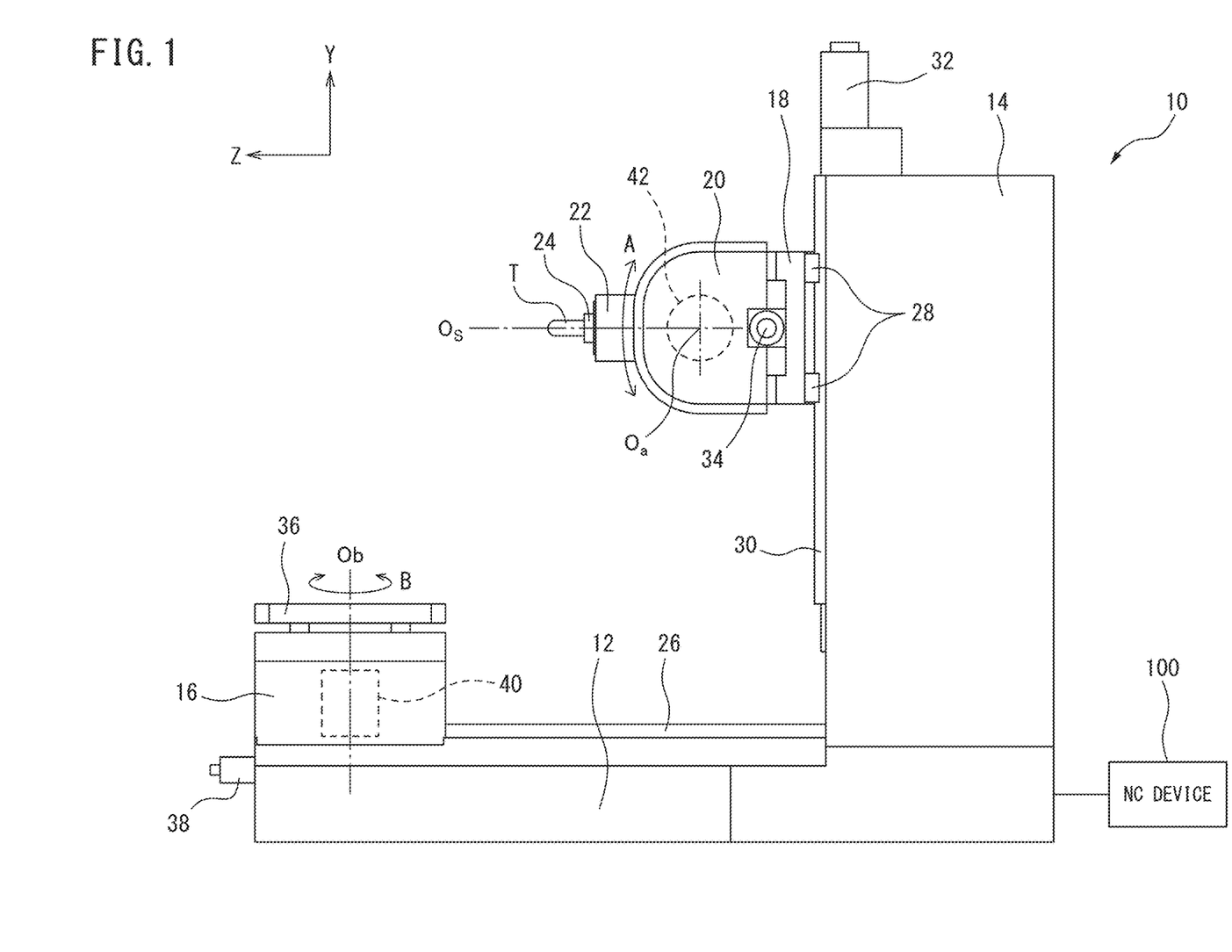
FIG. 1 is a simplified side view of a machine tool to which a tool path generation method according to a preferred embodiment of the present invention is applied.

Referring to FIG. 1, the machine tool 10 to which the tool path generation method according to a preferred embodiment of the present invention is applied comprises a bed 12 as a base mounted on the floor of a factory, a table 16 provided on a front portion (the left side in FIG. 1) of the upper surface of the bed 12 so as to be movable in the horizontal forward and rearward directions or Z-axis direction, a column 14 which stands on and is affixed to an upper surface of the bed 12 on a rear end side thereof (the right side of FIG. 1), a Y-axis slider 18 provided, as a moving body which moves in the upward and downward directions, on the front surface of the column 14 so as to be movable in the upward and downward directions or Y-axis direction, an X-axis slider 20 which is provided on the front surface of the Y-axis slider 18 so as to be movable in the horizontal leftward and rightward directions or X-axis direction (the direction perpendicular to the sheet of FIG. 1), and a spindle head 22 which is attached to the X-axis slider 20 and which rotationally supports a spindle 24.

The table 16 is provided on the upper surface of the bed 12 so as to be reciprocal along a pair of Z-axis guide rails 26 which extend in the horizontal Z-axis direction (the leftward and rightward directions in FIG. 1), and a pallet 36 on which a workpiece (not illustrated) is secured is attached to the upper surface of the table 16. In the present embodiment, a B-axis servo motor 40 is incorporated in the table 16, and the pallet 36 is supported so as to be capable of being rotationally fed in the B-axis direction about the axis $O_b$ extending in the vertical direction.

A ball screw (not illustrated) extending in the Z-axis direction and a Z-axis servo motor 38 which is connected to one end of the ball screw are provided on the bed 12 as a Z-axis feed device which reciprocally drives the table 16 along the Z-axis guide rails 26, and a nut (not illustrated) which engages with the ball screw is attached to the table 16.

The Y-axis slider 18 is provided on the front surface of the column 14 so as to be reciprocal along a pair of Y-axis guide rails 30 which extend in the Y-axis direction (the vertical direction). A ball screw (not illustrated) extending in the Y-axis direction and a Y-axis servo motor 32 which is connected with one end, the upper end in the present example, of the pair of ball screws are provided on the column 14 as a Y-axis feed device which reciprocally drives the Y-axis slider 18 along the Y-axis guide rails 30, and a nut (not illustrated) which engages with the ball screw is attached to the Y-axis slider 18.

The X-axis slider 20 is provided on the front surface of the Y-axis slider 18 so as to be reciprocally movable along a pair of X-axis guide rails (not illustrated) which extend in the X-axis direction (the direction perpendicular to the sheet of FIG. 1). A ball screw (not illustrated) extending in the X-axis direction, and an X-axis servo motor 34 which is connected with one end of the ball screw are provided on the Y-axis slider 18 as an X-axis feed device which reciprocally drives the X-axis slider 20 along the X-axis guide rails, and a nut (not illustrated) which engages with the ball screw is attached to the X-axis slider 20.

The X-axis slider 20 comprises a pair of A-axis arms which project forwardly in the Z-axis direction, and the spindle head 22 is supported between the A-axis arms so as to be rotatably feedable in the A-axis direction about the X-axis and the parallel inclination axis Oa. An A-axis servo motor 42 for rotatably feeding the spindle head 22 in the A-axis direction about the inclination axis Oa is incorporated in one of the A-axis arms. The spindle head 22 supports the spindle 24 so as to be rotatable about the central axis Os. A servo motor (not illustrated) for rotationally driving the spindle 24 is incorporated in the spindle head 22.

Thus, the machine tool 10 moves the tool T mounted on the tip of the spindle 24 and the workpiece, which is secured to the pallet 34 and mounted on the table 16 along with the pallet 34, relative to each other by controlling each of the X-axis, Y-axis, Z-axis, A-axis, and B-axis with the NC device 100 to machine the workpiece with the tool T.

Figure 2:
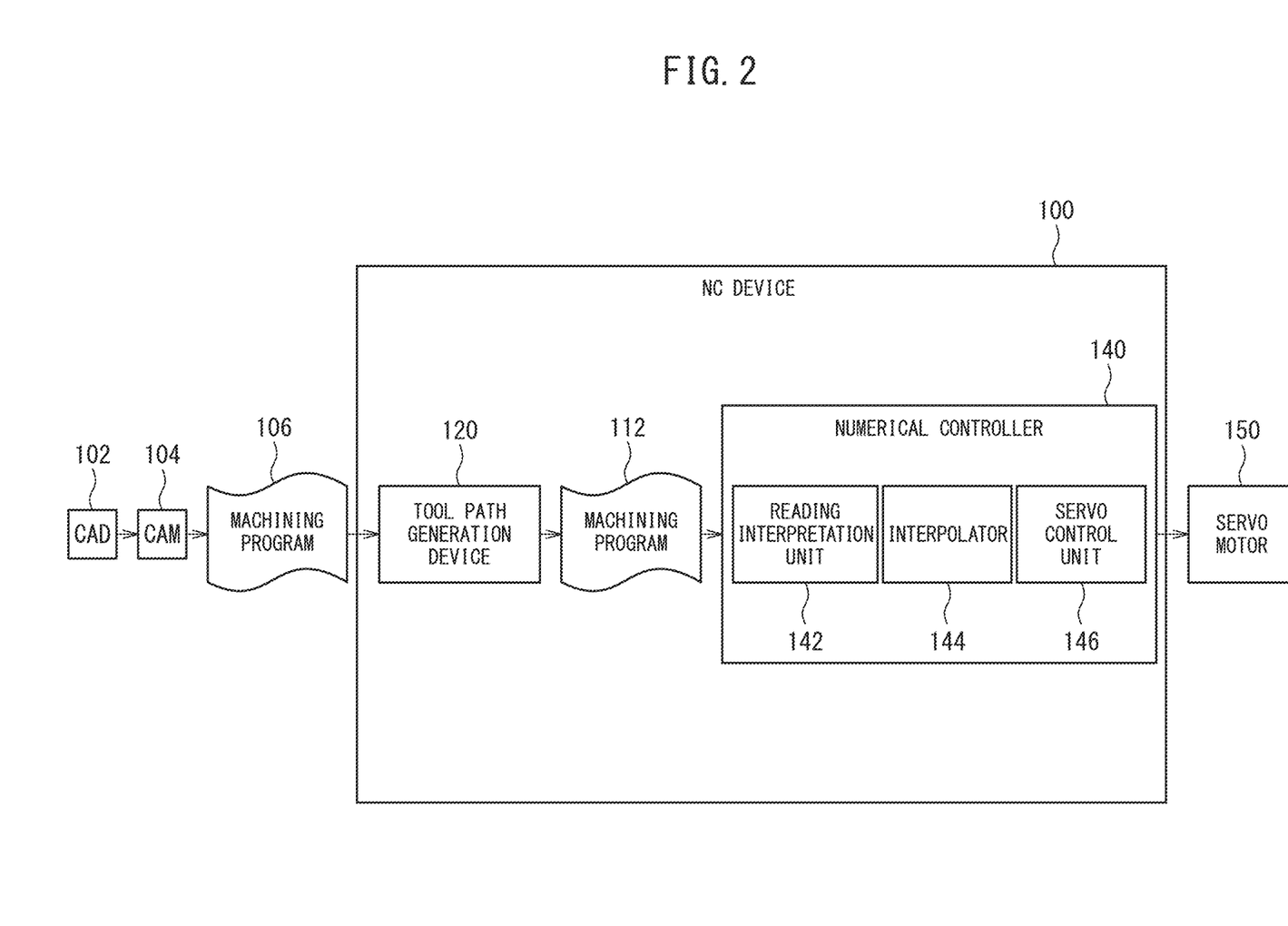
FIG. 2 is a simplified block diagram showing an NC device of the machine tool of FIG. 1 in which a tool path generation device is incorporated.

Referring to FIG. 2, the NC device 100 comprises a tool path generation device 120 and a numerical control unit 140. The tool path generation device 120 smooths the change in the posture of the tool in the machining program 106 generated by the CAM device 104, generates a new machining program 112, and transmits the new machining program 112 to the numerical control unit 140. Like conventional NC devices, the numerical control unit 140 comprises a reading interpretation unit 142, an interpolator 144, and a servo control unit 146. The NC device 100 drives the servo motors 150 of each of the axes of the machine tool 10 based on the machining program 112 generated by the tool path generation device 120. It should be noted that in FIG. 2, the servo motor 150 represents the servo motors 34, 32, and 38 of the X-axis, Y-axis, and Z-axis orthogonal feed axes as well as the servo motors 42 and 40 of the A-axis and B-axis rotary feed axes, and the X-axis, Y-axis, and Z-axis servo motors 34, 32, and 38 and the A-axis and B-axis servo motors 42 and 40 are independently controlled by the NC device 100.

Figure 3:
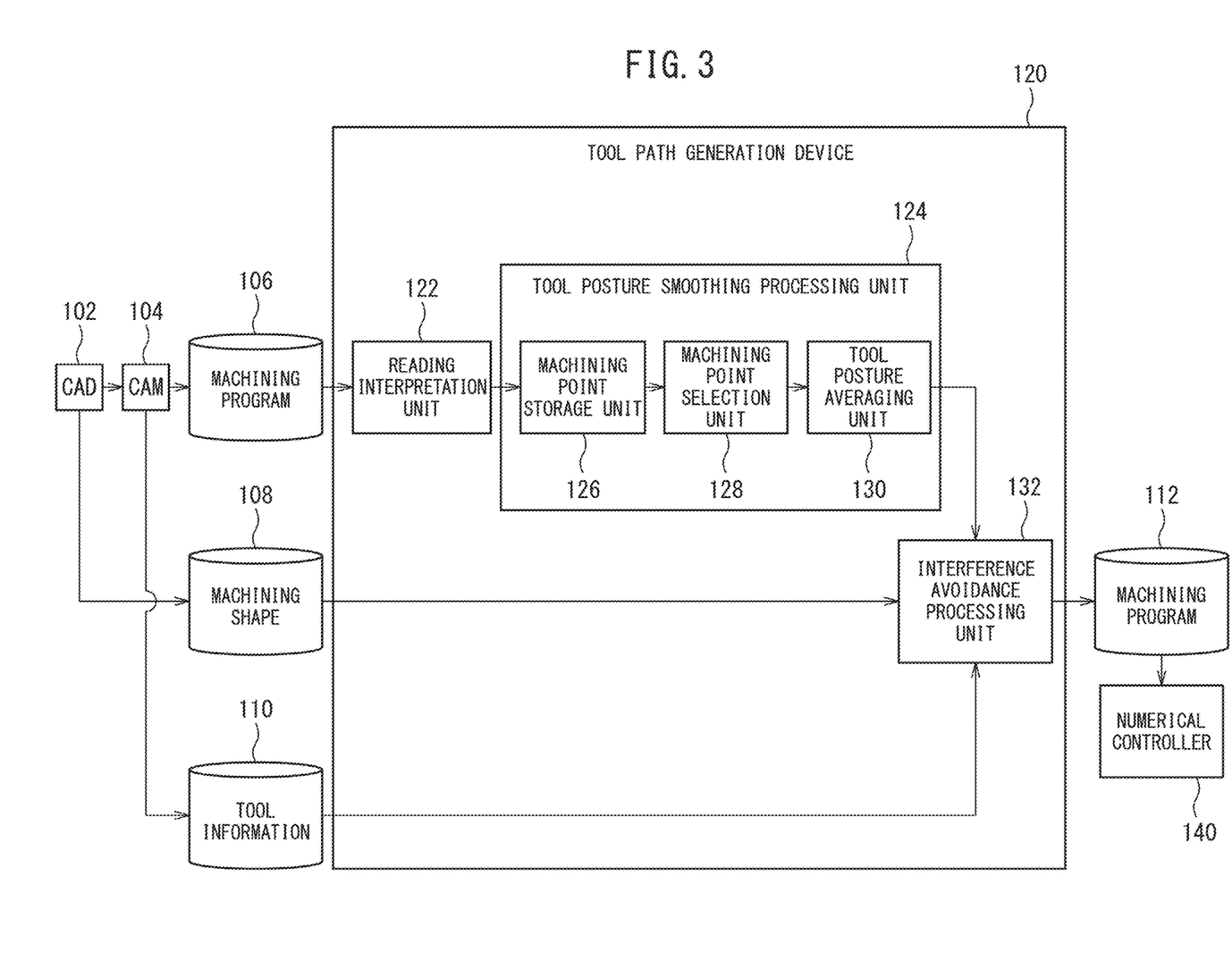
FIG. 3 is a simplified block diagram showing the tool path generation device.

Referring to FIG. 3, the tool path generation device 120 comprises a reading interpretation unit 122, a tool posture smoothing processing unit 124, and an interference avoidance processing unit 132, and the tool posture smoothing processing unit 124 comprises a machining point storage unit 126, a machining point selection unit 128, and a tool posture averaging unit 130.

The machining program 106 is generated by a known CAD/CAM system. In other words, a CAD device 102 generates CAD data corresponding to the machining shape of the workpiece. The CAM device 104 generates CAM data, which is a set of minute linear commands, based on the CAD data. Since the CAM data is composed of a huge quantity of point cloud data, a machining program comprising a plurality of machining points and feed speed is produced by extracting data from the CAM data in accordance with predetermined rules in order to reduce the quantity of data to an amount suitable for the machining program.

In the machining program 106, the coordinate data of the machining points is expressed in a block format by X-axis, Y-axis, Z-axis, A-axis, and B-axis coordinate values. When the number of machining points from the machining start point to the machining end point is defined as N, a machining point numeral from 1 to N is assigned to each machining point, and the tool path, which is composed of command values of the tool trajectory during workpiece machining, is obtained by sequentially connecting the machining points P (block endpoints) in numerical order.

Figure 4:
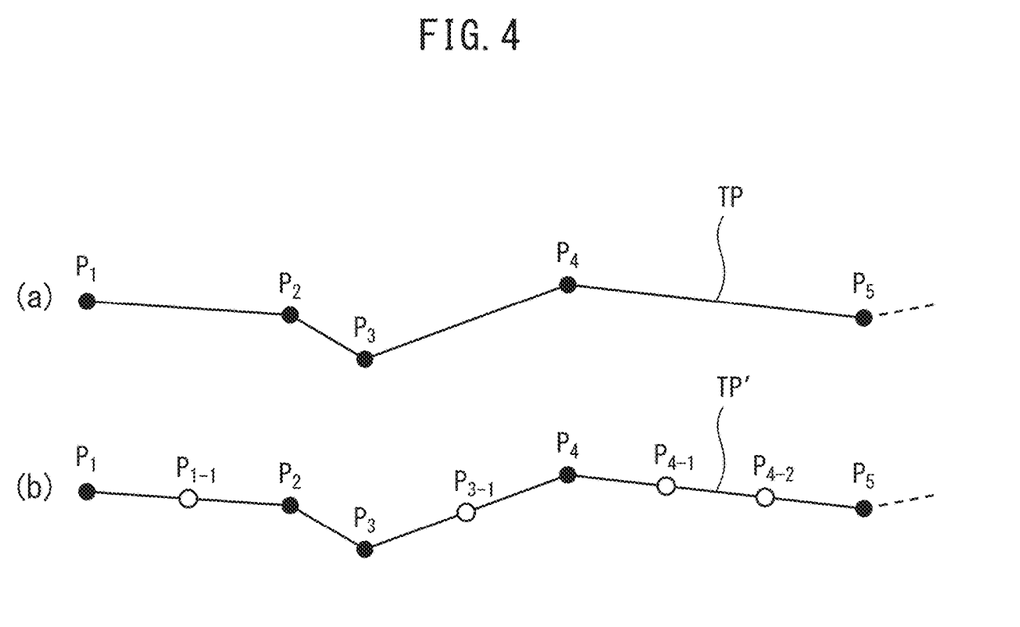
FIG. 4 is a schematic view detailing tool path, machining points, and divided machining points.

The reading interpretation unit 122 reads and interprets the machining program 106 and generates data related to the machining points and tool path generation. The machining point storage unit 126 of the tool posture smoothing processing unit 124 associates and stores each machining point with the tool path on which the machining point is included. FIG. 4(a) shows a cut portion of a single tool path TP of the read and interpreted machining program 106 along with machining points P1, P2, . . . . The length of the distance between the machining points is determined in accordance with the magnitude of the tolerance stored in advance when the CAM device 104 linearly approximates the curve along the workpiece surface to be machined. Though smoothing processing of the tool posture may be performed under the assumption that the positions and number of the machining points is the positions and number of machining points described in the machining program 106 output from the CAM device 104, in order to perform smoothing processing with higher accuracy, a threshold value for the distance between machining points is set in advance, and when the distance between machining points exceeds the threshold, by dividing into two, three, etc., groups, the accuracy of the smoothing processing of the tool posture can be increased. Thus, in FIG. 4(b), the tool path TP' is shown in a manner in which one divided machining point P1-1, P3-1 is added between P1 and P2 and between P3 and P4, respectively, and two divided machining points P4-1, P4-2 are added between P4 and P5. In the case in which divided machining points are added, the machining point storage unit 126 calculates and stores the X-axis, Y-axis, Z-axis, A-axis, and B-axis coordinate values of all of the machining points including the added divided machining points. Note that the coordinate values of the divided machining points are calculated by interpolating the coordinate values of the machining points on either ends thereof. In the following description, the machining points are described without distinguishing between machining points and divided machining points.

Figure 5:
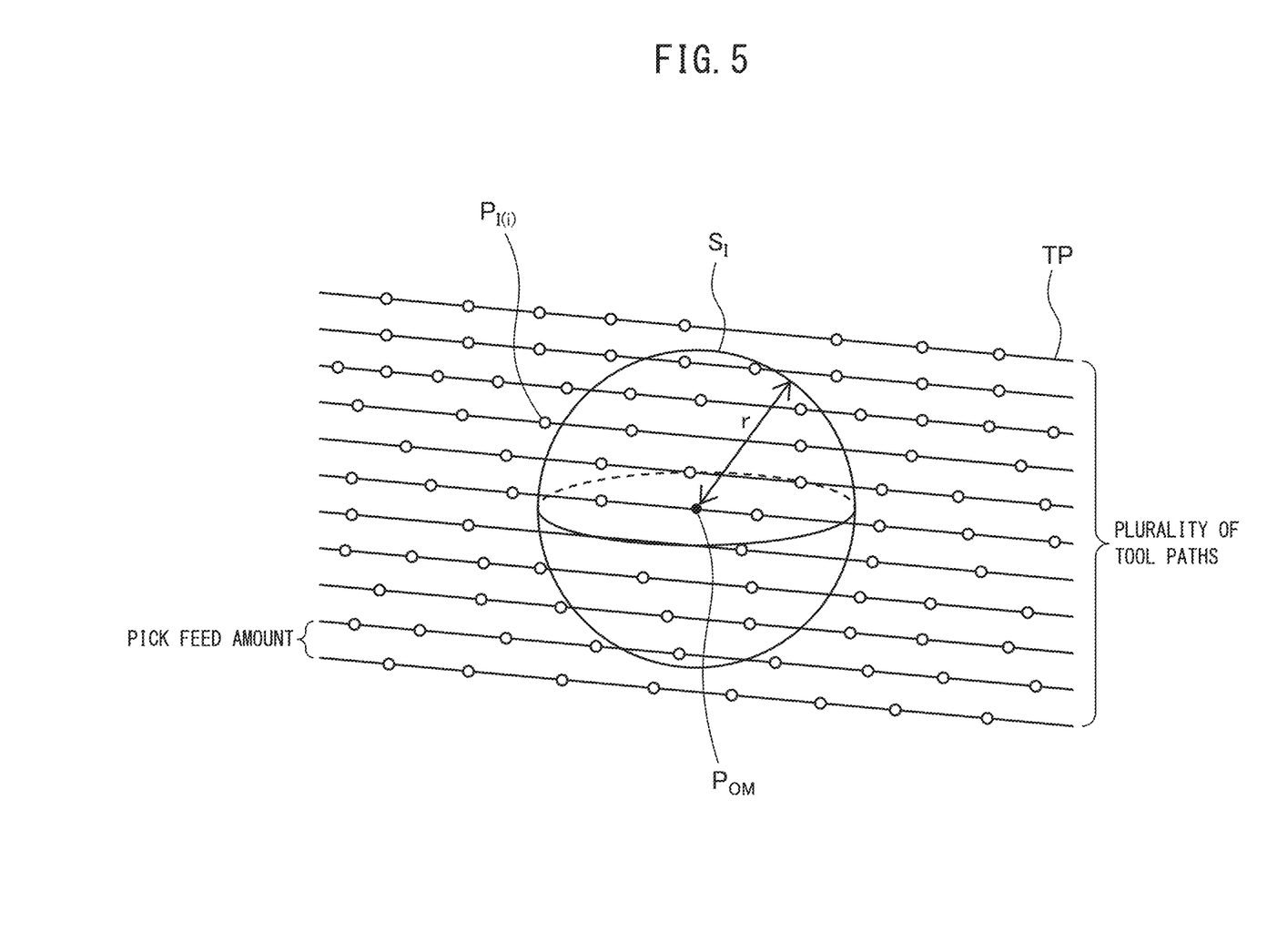
FIG. 5 is a schematic view detailing the method for selecting machining points of interest.

The machining point selection unit 128 selects a single target machining point POM from the machining points stored in the machining point storage unit 126. Next, machining points included within an inspection area defined by a sphere SI having a predetermined radius r centered on the target machining point POM are selected as machining points of interest PI(i). As used herein, i=1 to N, and N is the number of machining points within the inspection area SI excluding the target machining point POM.

Figure 6:
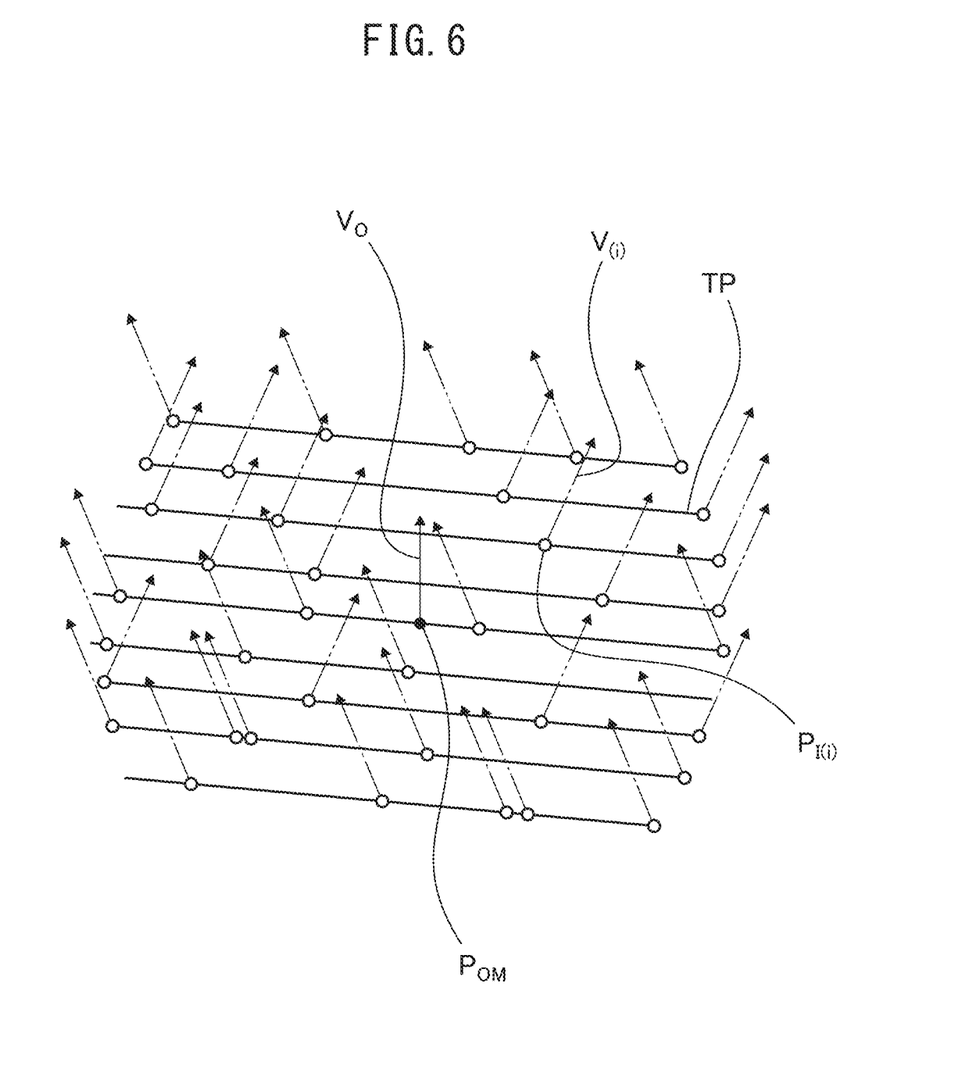
FIG. 6 is a schematic view detailing the method for correcting the tool posture.
Figure 7:
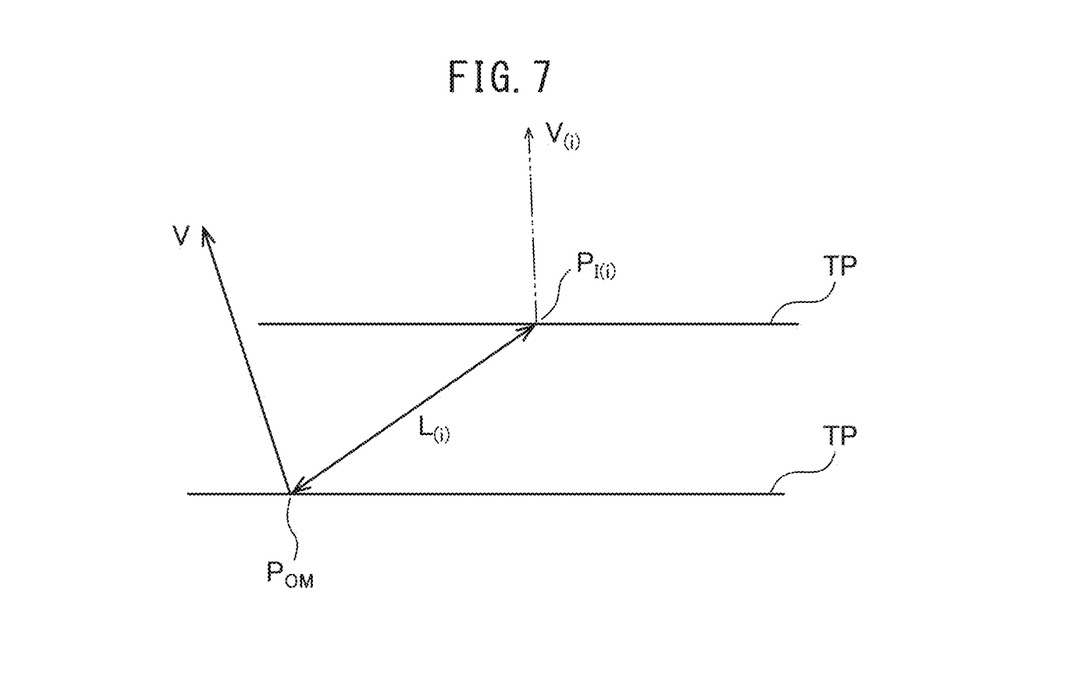
FIG. 7 is a schematic view showing vectors representing the tool posture at the target machining point and the machining points of interest.
Figure 8:
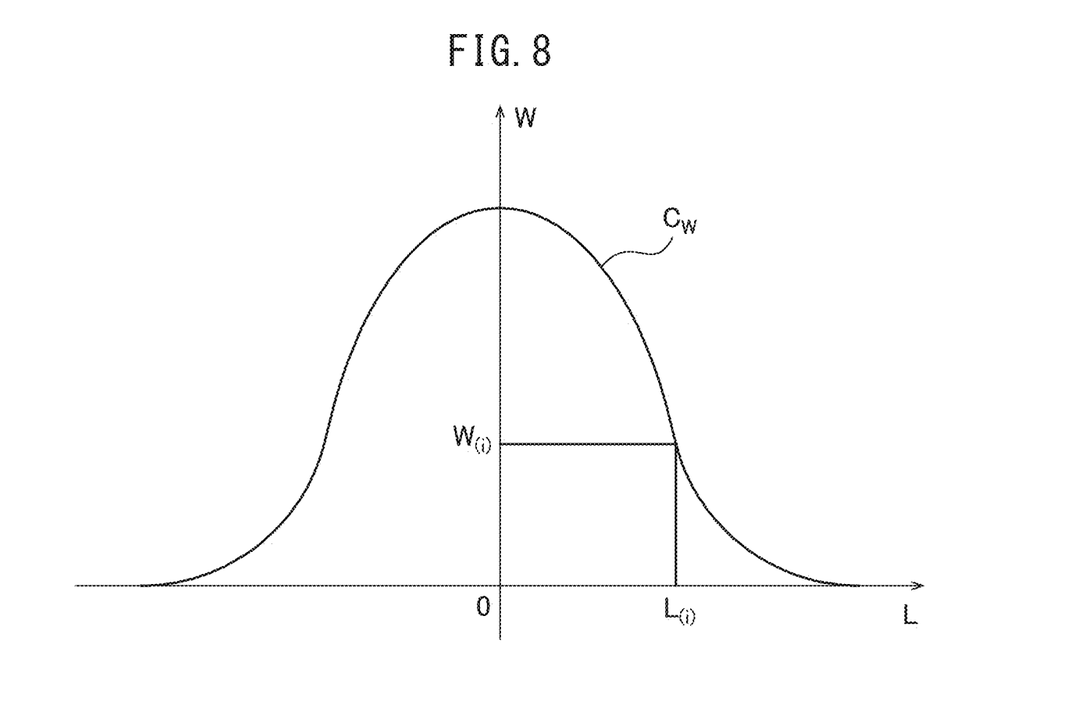
FIG. 8 is a schematic view showing a weighted curved.

The tool posture averaging unit 130 calculates the vector V0 of the central axis O of the tool at target machining point POM from the X-axis, Y-axis, Z-axis, A-axis, and B-axis coordinate values. Next, the distance L(i) between the target machining point POM and the machining point of interest PI(i) and the vector V(i) of the central axis of the tool at the machining point of interest PI(i) is calculated for all of the machining points of interest PI(i) (refer to FIG. 7). Next, the distances L(i) between each machining point of interest PI(i) and the target machining point POM are set as parameters, and the weight W(i) at the machining point of interest PI(i) is determined. The weight W(i) can be given by, for example, a weighted curve CW, as shown in FIG. 8. Next, the tool posture averaging unit 130 calculates the vector V as the corrected tool posture of the tool at the target machining point POM by the formula V=ΣW(i)×V(i). The tool posture smoothing processing unit 124 calculates the vector V for all of the machining points, and based thereon, corrects the machining program 106. In FIG. 6, the tool postures at the machining points of interest PI(i) along the plurality of tool paths within the inspection area 51 are represented by arrows having two dashes, and the corrected tool posture at the target machining point POM calculated by the tool posture smoothing processing unit 124 is represented by the solid arrow. In FIG. 6, though the tool posture changes significantly for each tool path, if smoothing processing of the tool posture is performed one by one using all of the machining points as target machining points, a tool posture display screen corresponding to FIG. 6 in which the tool posture changes smoothly in all machining areas can be drawn.

Figure 9:
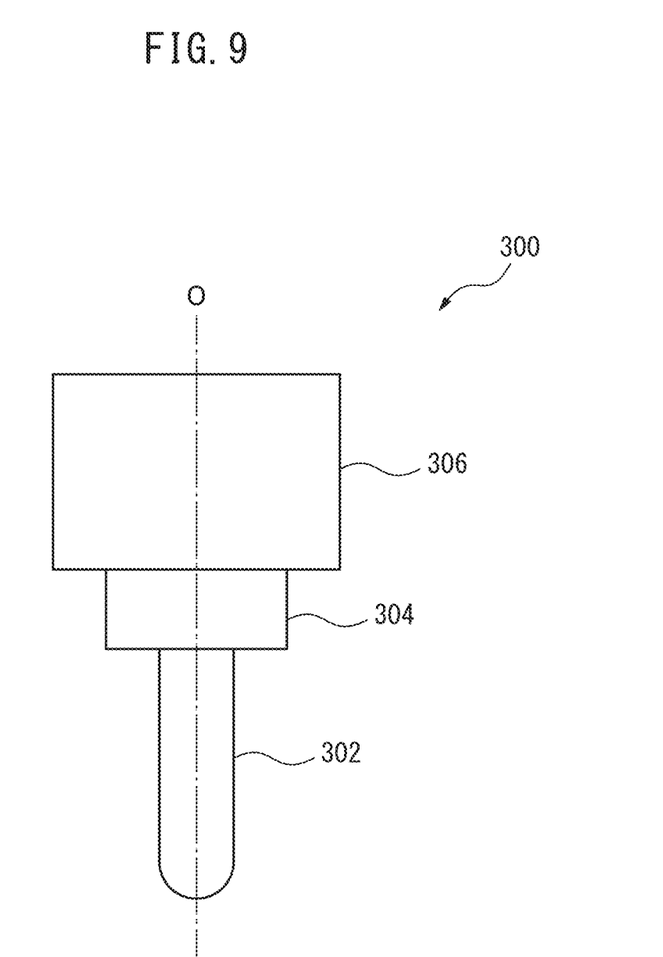
FIG. 9 is a view showing a tool model shape.

Next, the interference avoidance processing unit 132 checks for interference between the tool and the workpiece or the stationary parts of the machine tool based on the vector V, which is the corrected tool posture. The interference avoidance processing unit 132 receives the machining shape 108 of the workpiece from the CAD device 102 and tool information 110 from the CAM device 104. The tool information 110 includes, in addition to the tool length (the length along the central axis O) and the tool diameter of the tool to be used, data related to the shape of the tool holder to be used. For example, the interference avoidance processing unit 132 generates a model shape 300 of the tool as shown in FIG. 9 based on the tool information 110. The model shape 300 includes the tool to be used, a tool portion 302 corresponding to the tool holder, a holder portion 304, and a spindle portion 306.

Figure 10:
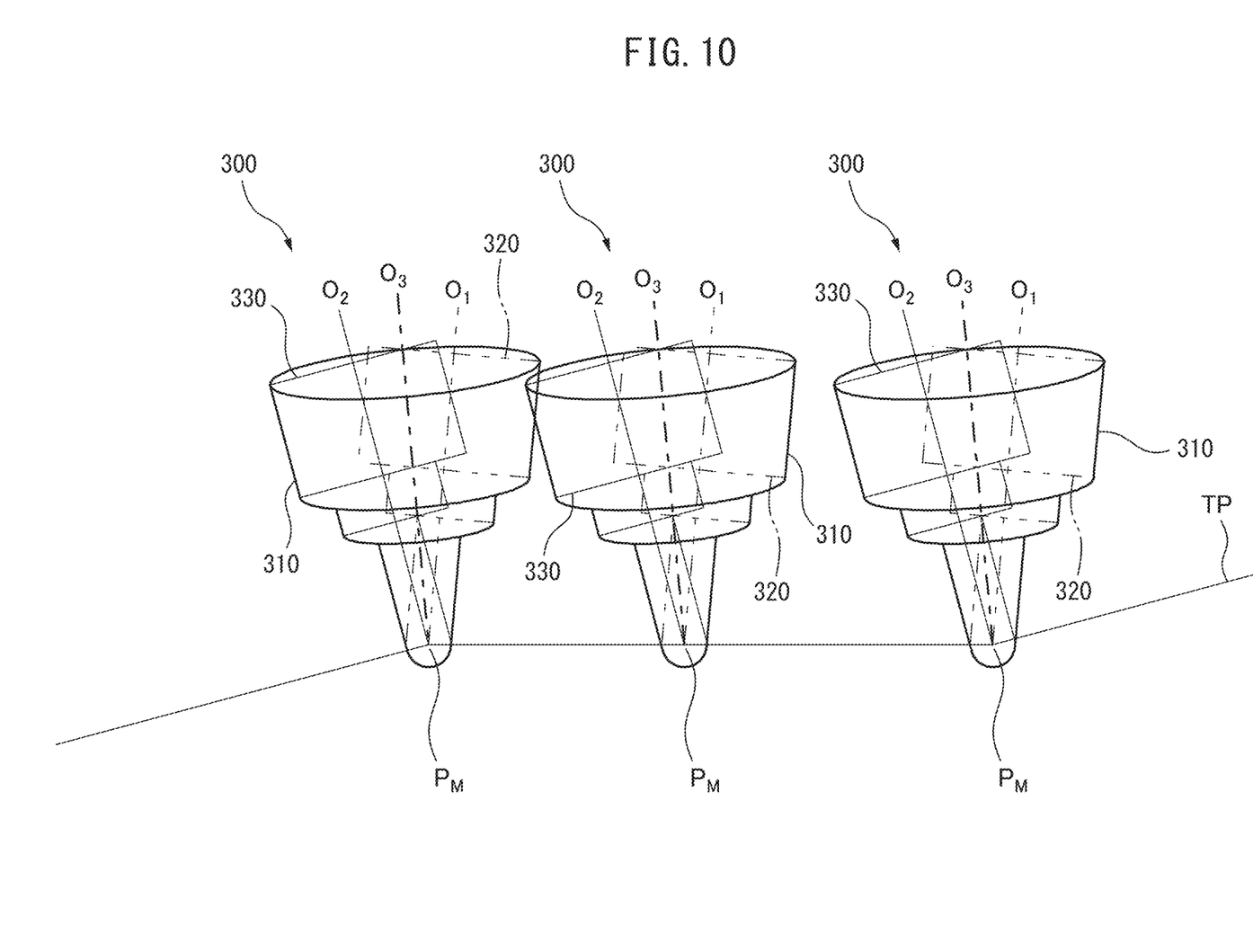
FIG. 10 is a schematic view detailing a method for checking for interference.

With reference to FIG. 10, the interference avoidance processing unit 132 generates an area composed of a plurality of conical surface with the outer shape of the model shape 320 of the tool prior to correction, which is represented by the dotted lines, and the outer shape of the model shape 330 of the tool, which is represented by the thin lines, drawn around a bisecting line O3 between the central axis O1 of the model shape 300 prior to correction and the corrected central axis O2 as an interference discrimination model shape 310. The interference avoidance processing unit 132 determines whether there is interference with the workpiece when the interference distinction model shape 310 moves along the tool path TP. When the interference distinction model shape 310 indicates that there is no interference with the workpiece, the interference avoidance processing unit 130 outputs the machining program corrected by the tool path generation device 120 to the numerical control unit 140 as a new machining program 112. When the interference distinction model shape 310 indicates that there is interference with the workpiece, the interference avoidance processing unit 130 reverts the machining program corrected by the tool path generation device 120 to the machining program prior to correction, and outputs the same to the numerical control unit 140 as the new machining program 112.

In the numerical control unit 140, the reading interpretation unit 142 reads and interprets the new machining program 112, and outputs a movement command. The movement command includes the feed amounts and feed speeds in the X-axis, Y-axis, and Z-axis linear feed directions and the A-axis and B-axis rotational feed directions. The movement command output by the reading interpretation unit 142 is transmitted to the interpolator 144. The interpolator 144 interpolates the received X-axis, Y-axis, and Z-axis linear feed direction and A-axis and B-axis rotational feed direction movement commands based on an interpolation function, and outputs X-axis, Y-axis, and Z-axis linear feed direction and A-axis and B-axis rotational feed direction position commands suitable for the feed speed to the servo control unit 146. The servo control unit 146 outputs voltage values for driving the servo motors of the X-axis, Y-axis, and Z-axis linear feed direction and the A-axis and B-axis rotational feed direction feed axes of the machine tool 10 from the received X-axis, Y-axis, and Z-axis linear feed direction and A-axis and B-axis rotational feed direction position commands to the X-axis, Y-axis, Z-axis, A-axis, and B-axis servo motors 150 of the machine tool 10.

In the example of FIG. 2, the tool path generation device is incorporated in the NC device, the machining program is read in advance, calculation of the tool posture smoothing processing and the interference avoidance processing of the present invention are performed, and operation control of a machine tool of a subsequent workpiece machining is executed in real time. However, the present invention is not limited thereto. The tool path generation device shown in FIG. 3 is incorporated in the CAM device or incorporated in an independent personal computer, the machining program with which tool posture smoothing processing and interference avoidance processing are performed may be created in advance, and the machining program may be sent to the NC device for machining of the workpiece.

REFERENCE SIGNS LIST

100 NC Device
102 CAD Device
104 CAM Device
106 Machining Program
108 Machining Shape
110 Tool Information
112 Machining Program
120 Tool Path Generation Device
126 Machining Point Storage Unit
128 Machining Point Selection Unit
130 Tool Posture Averaging Unit
132 Interference Avoidance Processing Unit
140 Numerical Control Unit
150 Servo Motor

The invention claimed is:

1. A method for generating a tool path when surface machining of a workpiece is performed by a machine tool comprising at least one rotary feed axis while changing a tool posture of an end mill relative to a workpiece, the method comprising the steps of:
   defining a plurality of tool paths, separated from each other by a pick feed amount, and each obtained by sequentially connecting a plurality of machining points in a straight line, based on coordinate data of the machining points, which includes X-axis, Y-axis, Z-axis, A-axis, and B-axis coordinate values;
   setting one machining point on one of the plurality of tool paths as a target machining point
   determining an examination region defined by a sphere having a predetermined radius around the target machining point, wherein the predetermined radius is selected so as to allow a plurality of machining points to be included in the examination region, and a plurality of tool paths, including at least one tool path adjacent the tool path extending through the target machining point, to extend through the examination region;

selecting the machining points within the examination region and on the tool paths extending through the examination region as machining points of interest;

calculating a tool posture at the target machining point by averaging the tool postures at the selected machining points of interest, correcting data related to the tool posture at the target machining point in accordance with the calculated average tool posture, acquiring shape data of the workpiece to be machined and shape data of the end mill to be used, checking for interference between the workpiece and the end mill based on the corrected tool posture data, and generating a new tool path based on the data related to the corrected tool posture when interference between the workpiece and the end mill does not occur.

2. The method for generating a tool path of claim 1, wherein the plurality of machining points comprise divided machining points which are obtained by dividing the distance between adjacent machining points on the tool paths and coordinate values which are calculated by interpolation.

3. The tool path generation method of claim 1, wherein the step of calculating the tool posture comprises averaging the tool postures of the machining points of interest weighted in accordance with the distance between the target machining point and the machining points of interest.

4. The tool path generation method of claim 1, wherein the corrected tool posture is reverted to the tool posture prior to correction when results of the checking for interference indicate that there is interference between the workpiece and the end mill.

5. The tool path generation method of claim 1, wherein the tool posture is corrected so that a center of rotation of the tool matches with a median between an axial direction of the tool prior to correction and the axial direction of the tool after correction when results of the checking for interference indicate that there is interference between the workpiece and the end mill.

6. The tool path generation method of claim 1, wherein the checking for interference comprises generating an interference distinction model shape based on the tool posture prior to correction and the tool posture after correction, and sequentially determining whether there is interference between the interference distinction model shape and the workpiece for each target machining point along the tool path.

7. A tool path generation device which generates a tool path when surface machining of a workpiece is performed by a machine tool comprising at least one rotary feed axis while changing a tool posture of an end mill relative to a workpiece, the device comprising:

a machining point selection unit configured to define a plurality of tool paths, separated by a pick feed amount, and each obtained by sequentially connecting a plurality of machining points in a straight line, based on coordinate data of the machining points, which includes X-axis, Y-axis, Z-axis, A-axis, and B-axis coordinate values, set one machining point on one of the plurality of tool paths as a target machining point, determine an examination region defined by a sphere having a predetermined radius around the target machining point so as to allow a plurality of machining points to be included in the examination region, and a plurality of tool paths, including at least one tool path adjacent the tool path extending through the target machining point, to extend through the examination region and select the machining points within the examination region and on the tool paths extending through the examination region as machining points of interest, a tool posture averaging unit which calculates a tool posture at the target machining point by averaging the tool postures at the selected machining points of interest, and corrects data related to the tool posture at the target machining point in accordance with the calculated average tool posture, and an interference avoidance processing unit which acquires shape data of the workpiece to be machined and shape data of the end mill to be used, checks for interference between the workpiece and the end mill based on the corrected tool posture data, and generates a new tool path based on the data related to the corrected tool posture when interference between the workpiece and the end mill does not occur.

\* \* \* \* \*